J. H. WAGENHORST.
VEHICLE WHEEL.
APPLICATION FILED JUNE 10, 1912.
1,160,224.
Patented Nov. 16, 1915.
2 SHEETS—SHEET 1.
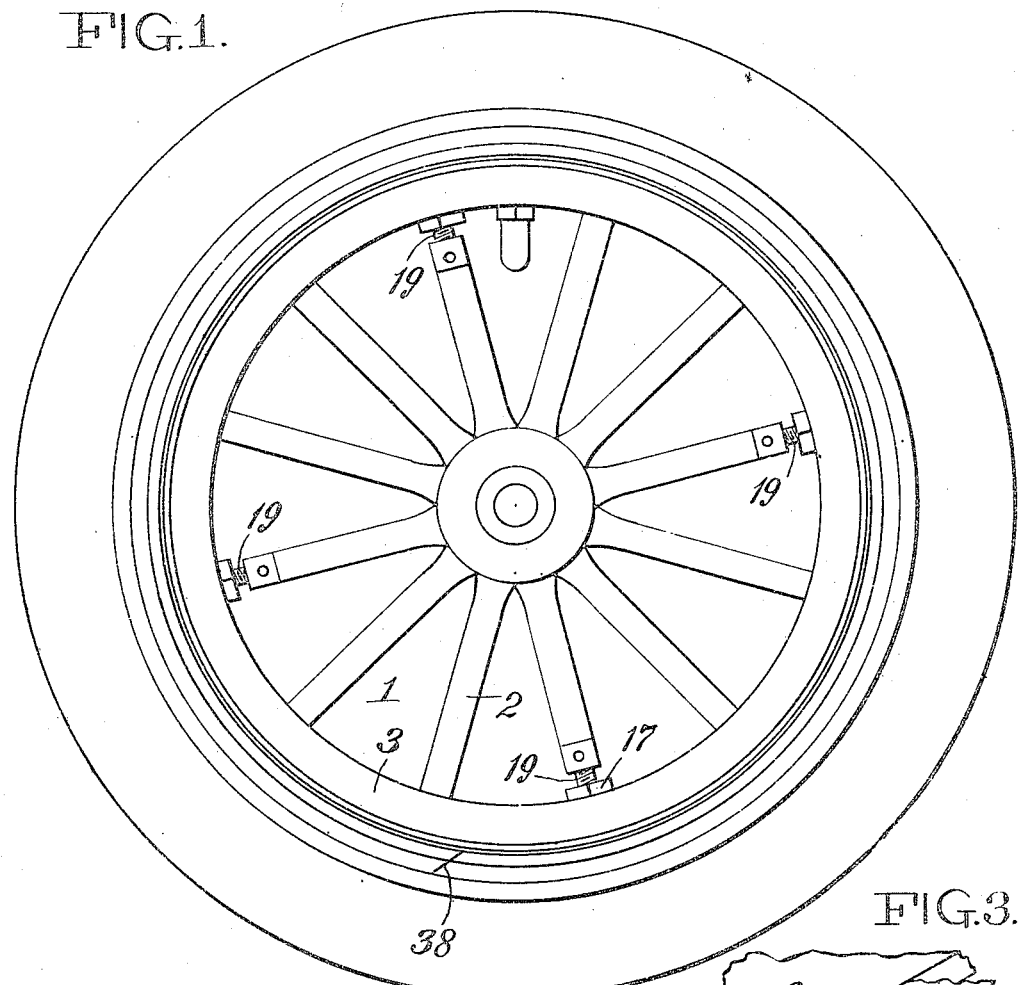
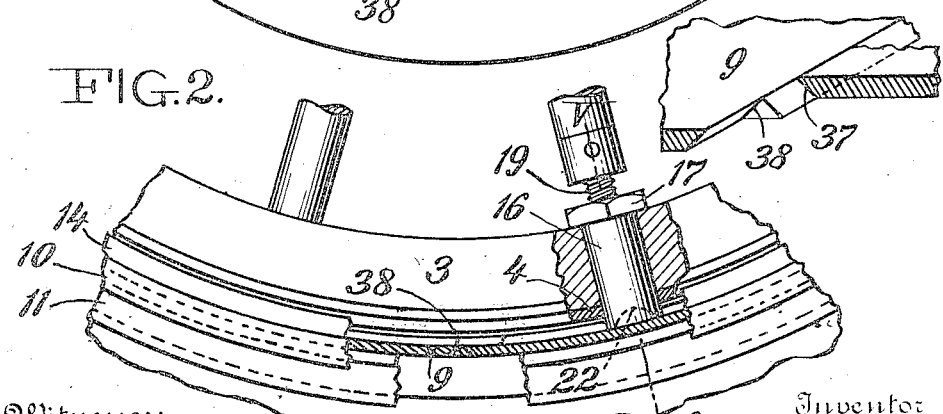

J. H. WAGENHORST.
VEHICLE WHEEL.
APPLICATION FILED JUNE 10, 1912.
1,160,224.
Patented Nov. 16, 1915.
2 SHEETS—SHEET 2.
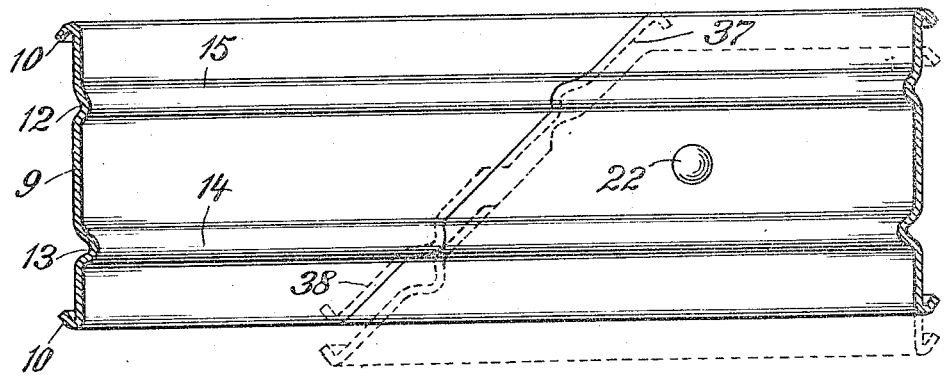
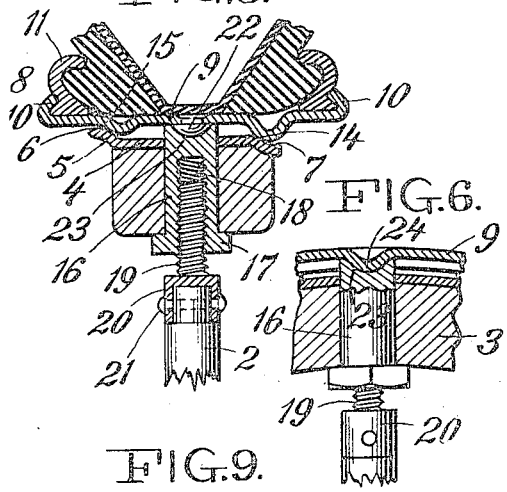
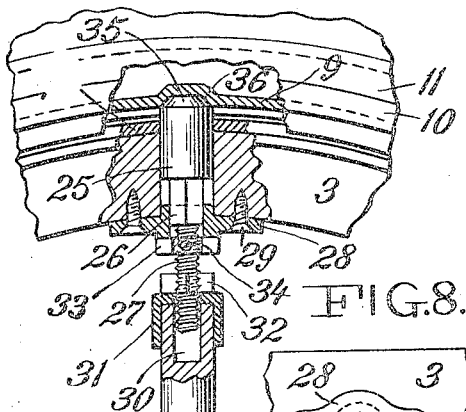
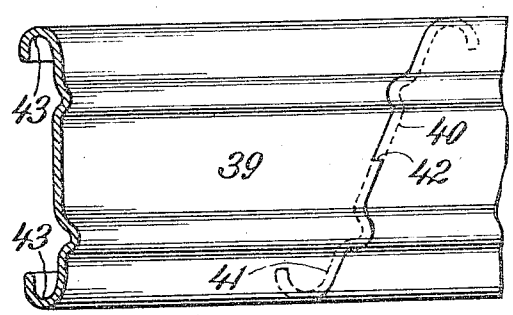
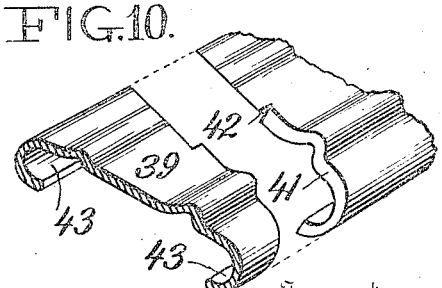
Witnesses
Karl S. Witz
Edmund Quincy Moses
Inventor
James H. Wagenhorst
By his Attorney
Seward Davis

UNITED STATES PATENT OFFICE.

JAMES H. WAGENHORST, OF AKRON, OHIO, ASSIGNOR, BY MESNE ASSIGNMENTS, OF TWO-FIFTHS TO THE B. F. GOODRICH COMPANY, OF NEW YORK, N. Y., A CORPORATION OF NEW YORK, ONE-FIFTH TO THE GOODYEAR TIRE & RUBBER COMPANY, OF AKRON, OHIO, A CORPORATION OF OHIO, AND ONE-FIFTH TO THE UNITED STATES TIRE COMPANY, OF NEW YORK, N. Y., A CORPORATION OF NEW YORK.

VEHICLE-WHEEL.

1,160,224.  Specification of Letters Patent.  Patented Nov. 16, 1915.

Application filed June 10, 1912. Serial No. 702,854.

*To all whom it may concern:*

Be it known that I, JAMES H. WAGENHORST, a citizen of the United States, residing in Akron, county of Summit, and State of Ohio, have invented certain new and useful Improvements in Vehicle-Wheels, of which the following is a specification.

This invention relates particularly to means for securing pneumatic or other resilient tires to vehicle wheels, and comprises improvements in the manner of securing a tire-carrying rim removably upon a wheel, so that the rim and tire carried thereby may be taken off and replaced by a duplicate rim carrying a second and preferably already inflated tire. My invention also comprises certain improvements in the structure of the tire-carrying rim.

In certain applications for patents heretofore filed by me, for example, in my applications Serial Nos. 668,771 and 672,544, filed December 30, 1911 and January 22, 1912, I have described a novel type of demountable rim in which the rim is secured to the wheel by means of bolts passing radially through the wheel felly and adapted to be forced outward into engagement with the under surface of the rim, thus lifting the rim away from the wheel felly at intervals and causing the same to grip the latter between the bolts. In all of such cases the bolts are carried by the felly of the wheel and the pressure upon the bolts is transmitted primarily to the wheel felly and secondarily from the felly to the spokes. In accordance with my present invention I transmit the pressure of the devices engaging the wheel felly directly to the spokes of the wheel instead of to the felly. The means by which I accomplish this result will be described in detail hereinafter.

In the accompanying drawings which form a part of this specification, Figure 1 is a side elevation of a wheel with a rim and tire thereon, embodying one form of my invention. Fig. 2 is a side elevation of a portion of the wheel, rim and tire shown in Fig. 1, a part of the rim and felly being broken away to show one of the radial bolts passing through the felly. Fig. 3 is a fragmentary sectional perspective view of a portion of the rim base, illustrating the manner in which the same is transversely split. Fig. 4 is a bottom plan view of a portion of the rim base, showing the transverse split therein, the dotted line showing the position into which one end of the rim base is moved to disengage the ends of the rim base and permit it to be collapsed. Fig. 5 is a transverse section on the line V—V of Fig. 2. Fig. 6 is a section through a portion of a wheel felly and rim, showing one of the radial bolts and the end of a spoke in elevation, the socket portion of the radial bolt being shown in section, and illustrating a modification of the structure shown in Figs. 2 and 5. Fig. 7 is a side elevation of a portion of a wheel showing a modification of my invention, a part of the rim, wheel felly and end of the spoke being shown in section to illustrate the construction of the radial bolt. Fig. 8 is a view of the under side of the wheel felly and felly plate secured thereto shown in Fig. 7, the squared portion of the radial bolt being shown in section. Fig. 9 is a plan view of the under side of a modified form of tire carrying rim showing the transverse split therein. Fig. 10 is a perspective view of a portion of the tire-carrying rim shown in Fig. 9, the ends of the rim being shown separated longitudinally.

Referring to the drawings in detail, the numeral 1 designates a vehicle wheel having spokes 2 and a felly 3. If the felly is of wood, it preferably has shrunk upon its periphery a metallic felly band 4, which is provided with bearing surfaces to be engaged by the bearing surfaces of the removable tire-carrying rim. The bearing surfaces of the wheel are preferably of different diameters. As illustrated in the drawings, the felly band 4 has at one side a raised outwardly curved flange 5, the upper surface of which forms a convex bearing surface 6, while at the opposite edge the felly band 4 is bent downward to provide a concave bearing surface 7. 8 is the tire-carrying rim, which, as shown in Figs. 1 to 5, comprises a rim base 9, having inwardly hooked flanges 10 formed at the edges thereof, these flanges engaging the endless, reversible tire-retaining flanges 11. The rim base is preferably transversely split at one point, as will be hereinafter described. The rim base is provided with bearing surfaces of different diameters, adapted to engage the bearing surfaces of different diameters formed upon the periphery of the wheel. As shown in the drawings, the rim base has two ribs 12 and 13 rolled therein, these ribs being preferably formed without thickening the metal of the rim, so that the rim base may be cold rolled from flat stock. The rib 13 is higher than the rib 12 and its outer surface forms a convex bearing surface 14 adapted to engage the bearing surface 7 at the edge of the felly band 4. The rib 12 is adapted to engage the bearing surface 6 of the felly band 4, the convex bearing surface 6 preferably engaging the concave surface 15 formed by the junction of the side of the rib 12 with the bottom of the rim base. By forming the bearing surfaces in the manner described, all of the bearing surfaces on the rim and felly band may be formed by the simplest cold-rolling operations, and yet a firm wedging engagement of the rim on the wheel may be secured, the contacting surfaces being of substantial area.

For securing the rim upon the wheel, means are provided for forcing the rim radially outward at intervals so as to cause the same to grip the periphery of the wheel between the points where the rim is forced out. In the form of my invention shown in Figs. 1 to 5, I provide for this purpose a number of studs passing radially through the wheel and felly and engaging the under surface of the rim, these studs being directly supported upon a corresponding number of spokes. As shown in the drawings, four equally disposed studs 16 are provided. Each stud comprises a cylindrical shank, having a head 17 shaped for engagement by a wrench or other means for turning the stud. Each stud has a screw-threaded socket 18 extending into the under side thereof, the screw 19 permanently secured to the end of one of the spokes screwing into this socket. The screw 19 may be secured to its spoke in any suitable manner; for example, it may be carried by cap 20, which fits over the end of the spoke and is held in position by means of a pin 21. The end of the stud 16 and the under surface of the rim are provided with suitable engaging means whereby the stud will lock the rim positively against lateral and circumferential movement. These engaging means may be of any suitable form. For example, as shown in Figs. 2, 4 and 5, a round-headed rivet 22 is secured to the rim base, the end of the stud having a depression 23 therein to receive this round head. The stud will thus hold the rim against lateral movement upon the wheel and thus insure the accurate centering of the rim, and will also prevent creeping of the rim and thus take the place of separate driving plates. In Fig. 6 I have shown a modification of the rim in which a rounded boss 24 is pressed in the metal of the rim base, this boss being received in the depression in the end of the radial stud in place of the head of the rivet shown in Figs. 4 and 5.

In the operation of my device it will be understood that there is sufficient clearance between the bearing surfaces on the rim and the bearing surfaces on the felly band to permit the rim to be applied to the wheel, the valve stem being "button-holed" through a hole in the felly. It will be understood that by providing the rim and felly band with bearing surfaces at each side of different diameters, the clearance necessary to permit the rim to be applied in this manner need be very slight. Only a fraction of the clearance is required to permit the rim to be applied to the wheel and removed when the separated bearing surfaces of different diameters are used, as compared with the clearance necessary if the rim and felly band are provided with cylindrical engaging surfaces or with separated bearing surfaces of equal diameter. The rim having been applied to the wheel, the radial studs 16 are rotated by means of a wrench applied to the heads thereof, the rotation of the studs causing them to unscrew from the fixed screws 19 and thus be forced positively in a direction radial from the hub. The studs are guided in their travel by the walls of the holes in the felly through which they slide, but the felly takes none of the radial stress, which is transmitted directly to the spokes carrying the studs. The screwing out of the studs causes the recesses in the ends thereof to receive the rounded heads of the rivets 22 and thus guide the rim into alined position with the wheel, and finally to force the rim out at intervals and thus take up the clearance between the rim and wheel and cause the bearing surfaces on the rim to tightly clamp the bearing surfaces on the felly band. To remove the rim from the wheel it is only necessary to screw the studs down on the screws 19, thus disengaging them from the rivets 22 and permitting the rim to assume its normal shape. The rim is then free to be removed.

In Fig. 7 I have shown a modification of my invention in which the radial studs 25 slide through holes in the felly but do not turn therein. Each stud 25 is provided with a squared portion 26 at its lower end, from which projects a screw-threaded portion 27. The squared portion 26 slides through a correspondingly shaped opening in a plate 28 secured to the under side of the felly by means of screws 29, or in any other suitable manner. The end of the screw-threaded portion 27 is received in a recess 30 formed in the end of a spoke, the end of the spoke preferably being protected by means of a cap 31 driven thereover. The screw-threaded portion 27 passes freely through an opening in the end of this cap. Screwing upon this threaded portion 27 and resting upon the top of the cap 31, is a nut 32. Rotating the nut 32, as will be readily understood, will force the stud away from the spoke and thus cause the same to engage the under side of the rim and lift the same from the periphery of the wheel near the point of engagement, as in the form of my invention already described. The screw-threaded portion 27 preferably carries also a lock nut 33 which normally remains in a predetermined position upon the portion 27, it being held in such position by means of a set-screw 34, if found desirable. This nut 33 serves as a means for limiting the outward movement of the radial stud, and thus prevents the rim from being mounted upon the wheel eccentrically owing to one stud being screwed out more than the others. The nut 33 will also jam against the underside of the plate 28 and thus prevent accidental loosening of the stud. The nut 33 may also be used to retract the stud in case it sticks in its hole through the felly and requires forcible dislodgment, this operation being accomplished by screwing the nut 32 out of contact with the cap 31, loosening the set-screw 34 and screwing the nut 33 against the under surface of the plate 28. In Fig. 7 I have shown the end of the stud 25 cone-shaped, as indicated at 35, and entering a similarly shaped depression 36 formed in the under surface of the rim base. It is obvious that this arrangement may be used in lieu of the corresponding means shown in Figs. 5 and 6 if desired.

In Fig. 4 I have illustrated a novel manner of transversely cutting a rim base, the ends of the rim base when in engagement being held against radial displacement in either direction. As shown in this figure and in Fig. 3, a cut 37 inclined in one direction to a radius, is made half-way across the rim base, a second cut 38 alined with the cut 37 but inclined in the opposite direction to a radius, being made across the other half of the rim base. These two cuts join in the middle so that the rim base is entirely severed, but the bevel of the two cuts being opposite, a portion of each end of the rim base overhangs a portion of the opposite end of the rim base so that the ends of the rim base are effectually interlocked against radial displacement. In order to separate the ends of the rim base it is necessary to offset one end of the same laterally with relation to the other, as indicated in dotted lines in Fig. 4. The ends of the rim base can then be telescoped and the rim base collapsed sufficiently to permit the endless flanges 11 engaging the tire to be removed. The operation of this rim base is similar to that of the tire-carrying rim described and claimed broadly in my application Serial No. 628,386, filed May 20, 1911, but the device here shown is of exceedingly simple construction, as the desired result is obtained by simply sawing the rim base half-way across in planes inclined in opposite directions to a radius. As will be understood, the ends of the rim base are normally held against lateral displacement by means of the endless flanges 11 which are forced against the inwardly projecting flanges 10 by means of air pressure in the tire.

In Figs. 9 and 10 I have shown a modification of the idea illustrated in Figs. 3 and 4. As shown in these figures, 39 is a rim which is severed half-way across by a cut 40, disposed in a plane at an angle to a radius, the other half of the rim being divided by a cut 41 oppositely inclined to a radius. The general direction of the line of division of the rim is oblique to the edges of the rim. This is also true of the form of rim shown in Fig. 4, but in the rim shown in Figs. 9 and 10 the ends of the two cuts 40 and 41 overlap, so to speak, so as to provide central shoulders 42. In the form illustrated in Fig. 4, the two cuts extend in opposite directions from a central line, so that no shoulder corresponding to the shoulder 42 is formed. The shoulders 42 prevent the relative lateral displacement of the ends of the rim 39 in either direction. The general obliquity of the cut in the rim to the edges of the rim prevents the lateral displacement of the ends in one direction, but this need not be relied on with the rim cut to provide the interlocking shoulders 42 which prevent movement in either direction. The split need not therefore be oblique. The opposite bevels of the two portions of the cut in the rim prevent the relative radial displacement of the ends of the rim in either direction. It will thus be seen that the ends of the rim are effectually interlocked against displacement in any direction except circumferentially; that is, the ends of the rim cannot slide by each other, but may be separated only by being drawn directly apart as illustrated in Fig. 10. For purposes of illustration, the rim 39 has been shown in Figs. 9 and 10 as provided with integral tire-retaining clenches 43 instead of with the endless separable tire retaining flanges as illustrated in Fig. 5.

Having thus described certain preferred embodiments of my invention, but without desiring to limit myself to the specific details described and illustrated, any further than as specified in the claims hereunto appended, I claim:

1. The combination in a vehicle wheel of a fixed rim, a demountable rim seated directly thereon, and means for causing their mutual engagement, comprising a radial stud carried by a fixed spoke of the wheel, said stud passing through said fixed rim and engaging the tire-carrying rim.

2. In combination in a vehicle wheel having a fixed rim, a plurality of spokes supporting said rim, a tire-carrying rim and means for securing the tire-carrying rim on the wheel including a plurality of studs passing through the fixed rim and carried by spokes intermediate of those supporting the fixed rim, said studs being adjustable with relation to said spokes and engaging the under-surface of said rim.

3. The combination in a vehicle wheel of a fixed rim and a demountable rim seated directly on said fixed rim, and means for causing their mutual engagement, comprising a plurality of studs axially alined with and carried by the spokes of the wheel, said spokes being fixed, said studs passing through the fixed rim and projecting above the surface of the fixed rim, the ends of said studs interlocking with portions of said demountable rim, and means for the radial adjustment of said studs.

4. In combination, a vehicle wheel, at least one of the spokes of which is short, a screw fixed to the end of said spoke and projecting therefrom in axial alinement with said spoke, a stud having a cylindrical portion sliding in a radially disposed hole through the felly of said wheel, said stud having a screw-threaded socket therein and screwing upon the screw carried by said spoke, said stud having an exposed head by which it may be rotated to cause the same to travel along said screw and through the hole in said felly, a tire-carrying rim mounted upon said wheel, the end of said stud engaging the under side of said tire-carrying rim when the stud is screwed to operative position.

5. In combination, a vehicle wheel provided with solid spokes, a tire-carrying rim, and means for securing the tire-carrying rim upon the wheel comprising radial studs carried by the wheel and adapted to be forced into engagement with the under-side of the tire-carrying rim, the under-side of said rim having lugs projecting inwardly therefrom, the ends of said studs being recessed to receive said lugs.

6. In combination, a vehicle wheel provided with solid spokes having screws attached thereto, a tire-carrying rim, and means for securing the tire-carrying rim upon the wheel comprising threaded studs coacting with said screws and adapted to be forced into engagement with the under-side of the tire-carrying rim.

JAMES H. WAGENHORST.

Witnesses:
SEWARD DAVIS,
EDMUND QUINCY MOSES.